July 15, 1930. A. H. HENNINGER 1,770,694
METHOD OF DETERMINING HYDROGEN SULPHIDE IN GAS MIXTURES
CONTAINING SULPHUR DIOXIDE, CARBONYL SULPHIDE, ETC
Filed Feb. 16, 1927
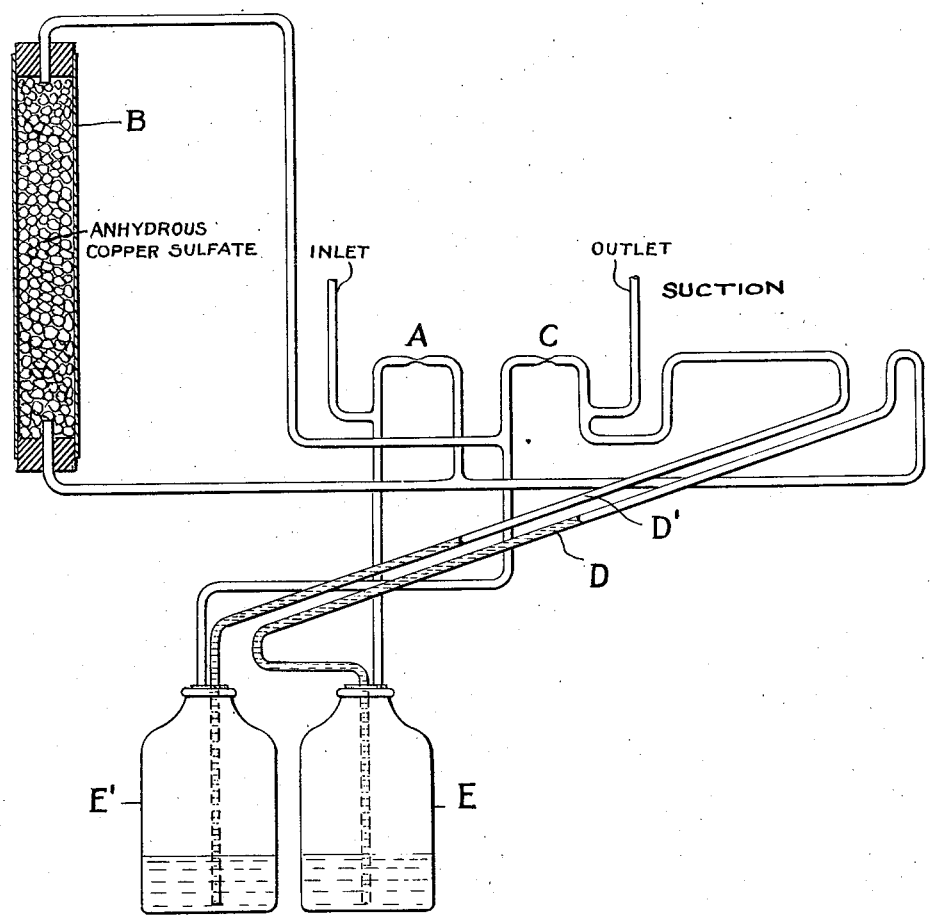
INVENTOR
Arthur H. Henninger
BY
Forbes Silsby
ATTORNEY Patented July 15, 1930

1,770,694

UNITED STATES PATENT OFFICE

ARTHUR H. HENNINGER, OF FLUSHING, NEW YORK, ASSIGNOR TO GENERAL CHEMICAL COMPANY, OF NEW YORK, N. Y., A CORPORATION OF NEW YORK

METHOD OF DETERMINING HYDROGEN SULPHIDE IN GAS MIXTURES CONTAINING SULPHUR DIOXIDE, CARBONYL SULPHIDE, ETC.

Application filed February 16, 1927. Serial No. 168,511.

The present invention relates to a method of separating hydrogen sulphide from gas mixtures containing the same in association with other sulphurous gases such as sulphur dioxide, carbonyl sulphide, etc., in the presence or absence of other gases such as carbon dioxide, carbon monoxide, etc., and more particularly to a method for the quantitative determination of hydrogen sulphide in such gas mixtures.

The object of the present invention is to provide a ready, rapid, and accurate method of determining hydrogen sulphide in gas mixtures which contain the same in association with sulphur dioxide, carbonyl sulphide, etc.

While it is known that the sulphates of many of the metals, particularly copper sulphate, will react with and absorb hydrogen sulphide, it has also been recognized and believed that the metal sulphide formed by the reaction of the hydrogen sulphide with the metal sulphate will readily react with and absorb sulphur dioxide. For this reason, sulphates of metals though used as absorbents for hydrogen sulphide in the absence of sulphur dioxide have not, as far as is known to me, been employed for the quantitative separation of hydrogen sulphide from gas mixtures which contain the same in association with sulphur dioxide.

As a result of experimental research, I have discovered that two particular sulphates, namely the sulphate of copper or silver when in the anhydrous state, in contradistinction to other metal sulphates, will completely and efficiently absorb hydrogen sulphide in gas mixtures containing the same in association with sulphur dioxide, carbonyl sulphide, etc., but will not absorb or in any way react with the sulphur dioxide, carbonyl sulphide, or other gases such as carbon dioxide or carbon monoxide, etc., which may be present.

Accordingly, therefore, my invention consists in passing the gas mixture to be analyzed, containing hydrogen sulphide and other sulphurous gases such as sulphur dioxide, carbonyl sulphide, etc., in the presence or absence of other gases such as carbon dioxide, carbon monoxide etc., in contact with anhydrous copper sulphate or silver sulphate whereby the hydrogen sulphide is selectively absorbed and the other sulphurous gases remain unaffected. The amount of hydrogen sulphide thus absorbed may be determined volumetrically by passing a known volume of gas in contact with the absorbent and noting the decrease in volume of the gases or gravimetrically by noting the increase in weight of the absorbent. Preferably, however, I determine the amount of hydrogen sulphide by means of flow meters whereby the relative volumes of gas before and after the absorption of the hydrogen sulphide are measured. By this means, the amount of hydrogen sulphide is continuously and automatically indicated, so that the character and quality of the gas mixture being analyzed is under observation at all times.

The accompanying drawing illustrates a preferred type of apparatus by means of which my invention may be practiced.

When anhydrous copper sulphate absorbent is employed in my novel process, it is prepared by igniting hydrated copper sulphate crystals for approximately one hour at about 250° C. When prepared in this manner, the anhydrous salt may be used without other admixture in the absorbing chamber or may be mechanically mixed with pumice, asbestos, or the like to provide a more porous mass. Preferably, however, the absorbent is prepared by impregnating pumice or asbestos with a concentrated solution of copper sulphate, drying the whole and igniting at about 250° C. for one hour. Similarly anhydrous silver sulphate may be used without a carrier but preferably the absorbent is prepared by impregnating a carrier such as pumice or asbestos therewith.

When a gas mixture containing hydrogen sulphide in association with sulphur dioxide and other sulphurous gases is contacted with this absorbent of anhydrous sulphate of copper or silver the hydrogen sulphide is completely and efficiently removed, while the sulphur dioxide and other gases are unaffected. In this manner a complete separation of sulphur dioxide and hydrogen sulphide may be made. Thus, by passing a known volume of gas to be analyzed in contact with the anhydrous salt of copper or silver sulphate, the amount of hydrogen sulphide in said gas may be determined by observing the decrease in volume of the gas or the increase in weight of the absorbent.

According to the preferred method of carrying out my invention, however, I provide for the continuous and automatic determination of the hydrogen sulphide constituent of the gas mixture to be analyzed. Referring to the accompanying drawing, the gas mixture to be analyzed, after suitable drying and filtration to free it from moisture and from any solid particles, passes through a capillary flow meter A. The flow meter is connected at one end to an inclined gauge D and at the other end to a large receiver E. The gas, after passing through the capillary flow meter A passes through the absorption chamber B where it comes into intimate contact with the anhydrous sulphate of copper or silver, the absorbent being preferably carried by pumice or asbestos impregnated therewith. In the chamber B, the hydrogen sulphide is absorbed and retained. The residual gas is conducted through a second capillary flow meter C and thence to the outlet. The flow meter C is connected at one end to an inclined gauge D', and at the other end to a large receiver E'. The gas is ordinarily conveyed through the system by means of a suction connected with the outlet. The inclined gauges are parallel and the inclination may be varied so as to change the sensitiveness to any desired degree. In operation, the flow of the inlet gas through the capillary A is registered upon the gauge D. The residual gas after the absorption of the hydrogen sulphide in the chamber B will be smaller in volume and will register on the gauge D' a decreased flow through the capillary C. The difference in flow, as indicated by the respective gauges, is a direct measure of the amount of hydrogen sulphide, and once the apparatus has been calibrated in the customary manner, well understood by those skilled in the art, a ready and accurate method is provided for the continuous and automatic indication of the amount of hydrogen sulphide in a gas mixture containing this constituent in association with sulphur dioxide, carbonyl sulphide, etc.

If desired, two or more absorbing towers B may be employed with suitable means for conducting the gas to be analyzed first thru one tower and subsequently thru a second while the previous tower, which has become inactive owing to its saturation with hydrogen sulphide, is being renewed with a fresh charge of the absorbent.

Various modifications may be made in the manner of applying my invention without departing from the spirit thereof, and I do not wish to limit the scope thereof except as is defined in the appended claims.

I claim:

1. The method of separating hydrogen sulphide from gas mixtures containing the same in association with sulphur dioxide which comprises passing said gas mixture into contact with an anhydrous sulphate of a metal of the group consisting of copper and silver.

2. The method of quantitatively determining hydrogen sulphide in gas mixtures containing the same in association with sulphur dioxide which comprises passing said gas mixtures into contact with an anhydrous sulphate of a metal of the group consisting of silver and copper, whereby the hydrogen sulphide is absorbed and the sulphur dioxide is unaffected, and determining the amount of hydrogen sulphide absorbed.

3. The method of quantitatively determining hydrogen sulphide in gas mixture containing the same in association with sulphur dioxide which comprises passing said gas mixtures into contact with anhydrous copper sulphate whereby the hydrogen sulphide is absorbed and the sulphur dioxide is unaffected, and determining the amount of hydrogen sulphide absorbed.

4. The method of determining hydrogen sulphide in gas mixtures containing the same in association with sulphur dioxide which comprises passing said gas mixture into contact with an anhydrous sulphate of a metal of the group consisting of silver and copper, and determining the change of volume in the gas so treated.

In testimony whereof, I affix my signature.

ARTHUR H. HENNINGER.